United States Patent
Liu et al.

(10) Patent No.: US 9,615,374 B1
(45) Date of Patent: *Apr. 4, 2017

(54) DIRECTIONAL CHANNEL MEASUREMENT AND INTERFERENCE AVOIDANCE

(71) Applicant: MARVELL INTERNATIONAL LTD., Hamilton (BM)

(72) Inventors: Yong Liu, Campbell, CA (US); Raja Banerjea, Sunnyvale, CA (US); Hongyuan Zhang, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,304

(22) Filed: Nov. 2, 2015

Related U.S. Application Data

(63) Continuation of application No. 12/763,019, filed on Apr. 19, 2010, now Pat. No. 9,178,593.

(60) Provisional application No. 61/171,362, filed on Apr. 21, 2009.

(51) Int. Cl.
*H04W 72/08* (2009.01)
*H04B 7/06* (2006.01)

(52) U.S. Cl.
CPC ............ *H04W 72/085* (2013.01); *H04B 7/06* (2013.01)

(58) Field of Classification Search
CPC ............................... H04W 72/085; H04B 7/06
See application file for complete search history.

(56) References Cited

U.S. PATENT DOCUMENTS

| | | |
|---|---|---|
| 5,844,522 A | 12/1998 | Sheffer et al. |
| 6,233,466 B1 | 5/2001 | Wong et al. |
| 6,259,683 B1 | 7/2001 | Sekine et al. |
| 6,498,939 B1 | 12/2002 | Thomas |
| 6,975,607 B2 | 12/2005 | Sekine et al. |
| 7,047,046 B2 | 5/2006 | Hoffmann et al. |
| 7,289,827 B2 | 10/2007 | Proctor, Jr. et al. |
| 7,308,285 B2 | 12/2007 | Nelson, Jr. et al. |

(Continued)

FOREIGN PATENT DOCUMENTS

| | | |
|---|---|---|
| EP | 1 912 346 | 4/2008 |
| EP | 2 104 245 | 9/2009 |

(Continued)

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11:Wireless LAN Medium Access Control (MAC) and Physical Layer (PHY) specifications: High-Speed Physical Layer in the 5 GHZ Band," The Institute of Electrical and Electronics Engineers, Inc., (1999).

(Continued)

*Primary Examiner* — Gregory Sefcheck

(57) ABSTRACT

A method in a communication network including a communication channel includes generating a first message, where the first message includes a field indicative of a direction along which a quality of the communication channel is to be measured, causing the first message to be transmitted to a target device, and receiving a second message responsive to the first message, where the second message includes at least one channel quality metric.

14 Claims, 14 Drawing Sheets

(56) References Cited

U.S. PATENT DOCUMENTS

| | | | |
|---|---|---|---|
| 7,333,774 | B2 | 2/2008 | Banerjee et al. |
| 7,342,535 | B2 | 3/2008 | Ann et al. |
| 7,366,464 | B2 | 4/2008 | Iacono et al. |
| 7,573,851 | B2 | 8/2009 | Xing et al. |
| 7,587,173 | B2 | 9/2009 | Hoffmann et al. |
| 7,627,348 | B2 | 12/2009 | Lysejko et al. |
| 7,659,850 | B1 | 2/2010 | Hou et al. |
| 7,680,093 | B2 | 3/2010 | Duan et al. |
| 7,751,367 | B2 | 7/2010 | Gaal et al. |
| 7,813,740 | B2 | 10/2010 | Wei et al. |
| 7,826,420 | B2 | 11/2010 | Habetha et al. |
| 8,000,716 | B2 | 8/2011 | Tsao et al. |
| 8,068,844 | B2 | 11/2011 | Li et al. |
| 8,073,490 | B2 | 12/2011 | van Rensburg et al. |
| 8,467,334 | B2 * | 6/2013 | Sohn .............. H04B 7/0452 370/328 |
| 8,559,571 | B2 * | 10/2013 | Tung .............. H04B 7/0413 375/346 |
| 8,630,588 | B2 | 1/2014 | Liu et al. |
| 8,660,060 | B2 * | 2/2014 | Sanayei ........... H04B 7/0417 370/321 |
| 8,706,039 | B2 | 4/2014 | Zhang et al. |
| 8,886,139 | B2 | 11/2014 | Zhang et al. |
| 9,178,593 | B1 | 11/2015 | Liu et al. |
| 2001/0024429 | A1 | 9/2001 | Sekine et al. |
| 2001/0024430 | A1 | 9/2001 | Sekine et al. |
| 2005/0068231 | A1 | 3/2005 | Regnier et al. |
| 2005/0124347 | A1 | 6/2005 | Hosein |
| 2006/0056345 | A1 | 3/2006 | Marinier et al. |
| 2006/0135173 | A1 | 6/2006 | Vannithamby |
| 2006/0148411 | A1 | 7/2006 | Cho et al. |
| 2006/0153110 | A1 | 7/2006 | Morgan et al. |
| 2006/0252428 | A1 | 11/2006 | Agashe et al. |
| 2007/0099571 | A1 | 5/2007 | Withers et al. |
| 2007/0213011 | A1 | 9/2007 | Kim et al. |
| 2008/0261658 | A1 | 10/2008 | Jin et al. |
| 2009/0005121 | A1 | 1/2009 | Wong et al. |
| 2009/0042579 | A1 | 2/2009 | Kitajima |
| 2009/0232106 | A1 | 9/2009 | Cordeiro et al. |
| 2009/0232245 | A1 | 9/2009 | Lakkis |
| 2010/0056062 | A1 | 3/2010 | Zhang et al. |
| 2010/0061271 | A1 | 3/2010 | Seyedi-Esfahani et al. |
| 2010/0103045 | A1 | 4/2010 | Liu et al. |
| 2010/0105406 | A1 | 4/2010 | Luo et al. |
| 2010/0164802 | A1 | 7/2010 | Li et al. |
| 2010/0164805 | A1 | 7/2010 | Niu et al. |
| 2011/0045785 | A1 | 2/2011 | Sutskover et al. |
| 2011/0170427 | A1 | 7/2011 | Koivisto et al. |
| 2012/0040629 | A1 | 2/2012 | Li et al. |
| 2013/0242968 | A1 | 9/2013 | Zhang et al. |

FOREIGN PATENT DOCUMENTS

| | | |
|---|---|---|
| WO | WO-9965160 | 12/1999 |
| WO | WO-2005/062496 | 7/2005 |
| WO | WO-2006/031495 | 3/2006 |
| WO | WO-2006/031499 | 3/2006 |
| WO | WO-2006/135653 | 12/2006 |
| WO | WO-2008/069245 | 6/2008 |

OTHER PUBLICATIONS

"IEEE P802.11™/D3.00, Draft Standard for Information Technology—Telecommunications and information exchange between systems—Local and metropolitan area networks—Specific requirements, Part 11: Wireless LAN Medium Access Control (MAC)andPhysical Layer (PHY) specifications: Amendment 4: Enhancements for Higher Through," The Institute of Electrical and Electronics engineers, Inc., Sep. 2007.

"IEEE P802.11™ IEEE Standard for Informaion Technology—Telecommunications and information exchange bewtween systems—Local and metropolitan area networks —Specific requirements, Part 11:Wireless LAN Medium Access Control (MAC) andPhysicalLayer (PHY) Specifications: Amendment 5: Enhancements for Higher Throughput," The Institute of Electrical and Electronics Engineers, Inc., Oct. 2009.

"IEEE 802.15.3™ Guide Addresses Untapped High-Rate Wireless Personal Area Network (WPAN) Market," The Institute of Electrical and Electronics Engineers, Inc., available at htt;://standards.ieee.org/announcements/pr.sub.—802153wpanguide.html(2004).

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specificrequirements—Part15.3:Wireless Medium Access Control (MAC) and Physical Layer (PHY) Specifications for High Rate Wireless Personal Area Networks (WPANs): Amendment 2: Millimeter-wave based Alternative Physical Layer Extension," The Institute ofElectrical andElectronics Engineers, Inc. (2008).

IEEE Std 802.15.3c/D07 (Amendment to IEEE Std 802.15.3-2003) "Draft Amendment to IEEE Standard for Information technology—Telecommunications andinformation exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2:Millimeter-wave based Alternative Physical Layer Extension," The Institute of Electrical and Electronics Engineers, Inc. (2009).

Abstract of Wylie-Green, et al., "Multi-band OFDM UWB solution for IEEE 802.15.3a WPANs," 2005 IEEE/Sarnoff Symposium on Advances in Wired and Wireless Communication, pp. 102-105, (2005).

Lakkis et al., "IEEE802.15.3c Beamforming Overview," Tensorcom, available at <https://mentor.ieee.org/802.11/dcn/09/11-09-0355-01-00ad-tg3c-beam- forming-overview.pdf>, doc.: IEEE 802.11-09/0355r0, Mar. 2009.

Myung-Hoon Yeon et al., "Enhanced adaptive antenna algorithms for asynchronous TDMA systems", 42nd Annual Conference on Information Sciences and Systems(CISS 2008), Institute of Electrical and Electronics Engineers, Mar. 19-21, 2008.

Mujtaba, "IEEE P802.11—Wireless LANs, TGn Sync Proposal Technical Specification," The Institute of Electrical and Electronics Engineers, Inc., doc.: IEEE 802.11-04/0889r6, May 2005.

van Nee et al., "The 802.11n MIMO-OFDM Standard for Wireless LAN and Beyond," Wireless Personal Communications, vol. 37, pp. 445-453 (Jun. 2006).

Zhang et al., "Applying Antenna Selection in WLANs for Achieving Broadband Multimedia Communications," IEEE Trans. on Broadcasting, vol. 52, No. 4, Dec. 2006.

\* cited by examiner

DIRECTIONAL CHANNEL MEASUREMENT AND INTERFERENCE AVOIDANCE

CROSS REFERENCE TO RELATED APPLICATION

This application is a continuation of U.S. application Ser. No. 12/763,019, entitled "Directional Channel Measurement and Interference Avoidance," filed Apr. 19, 2010, which claims the benefit of U.S. Provisional Patent Application No. 61/171,362, entitled "Directional Channel Measurement and Interference Avoidance," filed Apr. 21, 2009. Both of the applications referenced above are hereby incorporated herein by reference in their entireties.

FIELD OF TECHNOLOGY

The present disclosure relates generally to communication systems and, more particularly, to techniques for assessing the quality of a communication channel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11n, and the IEEE draft standards 802.15.3, and 802.15.3c now in the process of being finalized, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a or the IEEE Standard 802.11n. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, antennas and, accordingly, associated effective wireless channels are highly directional at frequencies near or above 60 GHz. As a result, the distance separating a pair of communicating devices has a significant impact on the data rate that the pair of communication devices can support. Further, when multiple antennas are available at one or both communicating devices, an efficient beam pattern allows the devices to better exploit spatial selectivity of the wireless channel and, accordingly, increase the data rate at which the devices communicate. Generally speaking, beamforming or beamsteering creates a spatial gain pattern having one or more high gain lobes or beams (as compared to the gain obtained by an omni-directional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission.

In general, communication devices develop an efficient beam pattern through an exchange of information such as beamforming training data (one such technique is described in U.S. patent application Ser. No. 12/548,393, filed on Aug. 26, 2009 and entitled "Beamforming by Sector Sweeping," and U.S. Provisional Patent Application No. 61/091,914 entitled "Beamforming by Sector Sweeping," filed Aug. 26, 2008, both of which are expressly incorporated by reference herein in their entireties). However, when a device attempts to discover other devices active on a communication channel, a beamforming pattern is not yet available. As a result, a communication device scans the channel in an omni-directional mode, and generally does not detect all activity occurring on the communication channel.

Activity occurring on a communication channel can include data transmissions such as broadcasts of beacons by a piconet central point (PCP), for example. On the other hand, activity can also include interference from such sources as adjacent stations in the same Basic Service Set (BSS) or a different BSS, other systems operating in the same frequency range (e.g., 60 GHz), radar pulses, etc. Some interference sources may be highly directional, especially at frequencies near or above 60 GHz.

SUMMARY

In an embodiment, a method in a communication network including a communication channel includes generating a first message, where the first message includes a field indicative of a direction along which a quality of the communication channel is to be measured, causing the first message to be transmitted to a target device, and receiving a second message responsive to the first message, where the second message includes at least one channel quality metric In various other embodiments, one or more of the following features may be included. Generating the first message includes indicating that the quality of the communication channel is to be measured for each of a plurality of directions including the direction, where each of the plurality of directions is a respective one of a plurality of sectors into which a spatial range of reception is divided. The direction is associated with a beamformed link of the target device. The direction is one of a plurality of sectors into which a spatial range of reception is divided, where the one of the plurality of sectors includes a direction with which a beamformed link of the target device is associated. The field is a first field; the first message includes a second field indicative of a mode according to which the quality of the communication channel is to be measured; and where the mode is one of Received Channel Power Indication (RCPI), Average Noise Power Indication (ANPI), and Receive Signal to Noise Indication (RSNI). The field is a first field; the first message includes a second field indicative of a type of the at least one channel quality metric, where the type is one of: a channel quality measurement for a particular direction; an average of a plurality of channel quality measurements for respective ones of a plurality of directions including the at least one direction, a variance of the plurality of channel quality measurements, a strongest one of the plurality of channel quality measurements, and a weakest one of the plurality of channel quality measurements. The method includes receiving an indication that a beamformed link associated with the target device is broken, where the first message is generated in response to the received indication; determining whether the target device is to switch to a new communication channel based on the at least one channel quality metric; if it is determined that the target device is to switch to the new communication channel, generating a third message that includes an indication that the target device is to switch to the new communication channel; and causing the third message to be transmitted to the target device. Determining whether the target device should switch to the new communication channel includes determining whether directional interference is present on the communication channel.

In another embodiment, a method in a communication network including a communication channel includes receiving a first message from a requesting device, where the first message includes a direction indicator; measuring the quality of the communication channel in accordance with the direction indicator to generate a directional quality metric, where the direction indicator specifies an omni-directional measurement or a measurement in at least one direction; and generating a second message to be transmitted to the requesting device, where the second message includes the directional quality metric.

In various other embodiments, one or more of the following features may be included. The requesting device is a Piconet Central Point (PCP). The direction indicator indicates a plurality of sectored directions; where measuring the quality of the communication channel includes measuring the quality of the communication channel for each of the plurality of sectored directions to generate a plurality of respective directional measurements; and generating the directional quality metric based on the plurality of directional measurements. Generating the directional quality metric includes calculating at least one of an average and a variance of the plurality of directional measurements. Measuring the quality of the communication channel includes measuring the quality of the communication channel on a beamformed link to the requesting device. Measuring the quality of the communication channel includes measuring the quality of the communication channel along a sectored direction, where the sectored direction includes a direction associated with a beamformed link to the requesting device.

In yet another embodiment, a method in a communication network including a communication channel, where data is received on the communication channel along a first direction to define a first communication link, includes detecting interference on the communication channel; determining whether the detected interference is directional; and defining a second communication link to receive data on the communication channel along a second direction distinct from the first direction if it is determined that the interference is directional.

In various other embodiments, one or more of the following features may be included. The communication channel is a first communication channel; and the method further includes defining a second communication link to receive data on a second communication channel distinct from the first communication channel if it is determined that the interference is not directional. Determining whether the interference is directional includes measuring interference on the communication channel for a plurality of directions to define a plurality of directional interference measurements; calculating variance of the plurality of directional interference measurements; and comparing the calculated variance to a threshold value to determine whether the interference is directional. The method includes measuring interference on the communication channel for a plurality of directions to define a plurality of directional interference measurements; and generating an interference mask that indicates, for each of the plurality of directions, whether the respective interference measurement is above a threshold value.

In still another embodiment, an apparatus includes a frame controller to generate communication frames to be transmitted to another device; and a directional measurement controller to cause the frame controller to generate a communication frame that includes a field indicative of a direction along which a quality of the communication channel is to be measured.

In various other embodiments, one or more of the following features may be included. The apparatus includes a measurement controller to locally measure a quality of the communication channel, where the directional measurement controller causes the measurement controller to locally measure the quality of the communication channel in at least one direction. The frame controller is further configured to receive communication frames from the other device, where the directional measurement controller causes the measurement controller to locally measure the quality of the communication channel in response to a communication frame received from the other device. The directional measurement controller causes the measurement controller to locally measure the quality of the communication channel in a plurality of sectored directions including the at least one direction to generate a plurality of respective directional measurements, where the directional measurement controller is further configured to generate at least one statistical metric based on the plurality of directional measurements.

In yet another embodiment, a method for beamforming in a communication system includes measuring interference on a communication channel during a first time period to generate interference data, wherein a data exchange occurs during the first time period; conducting beamforming training during a second time period to generate beamforming data; and generating a steering vector based on the interference data and the beamforming data.

In still another embodiment, the following features are included. Measuring interference during the first time period includes measuring the interference along a plurality of directions to generate a plurality of respective directional measurements; and identifying a set of one or more directions along which the interference exceeds a threshold value; where conducting beamforming training during the second time period includes filtering out the identified set of one or more directions.

DETAILED DESCRIPTION

Figure 1A:
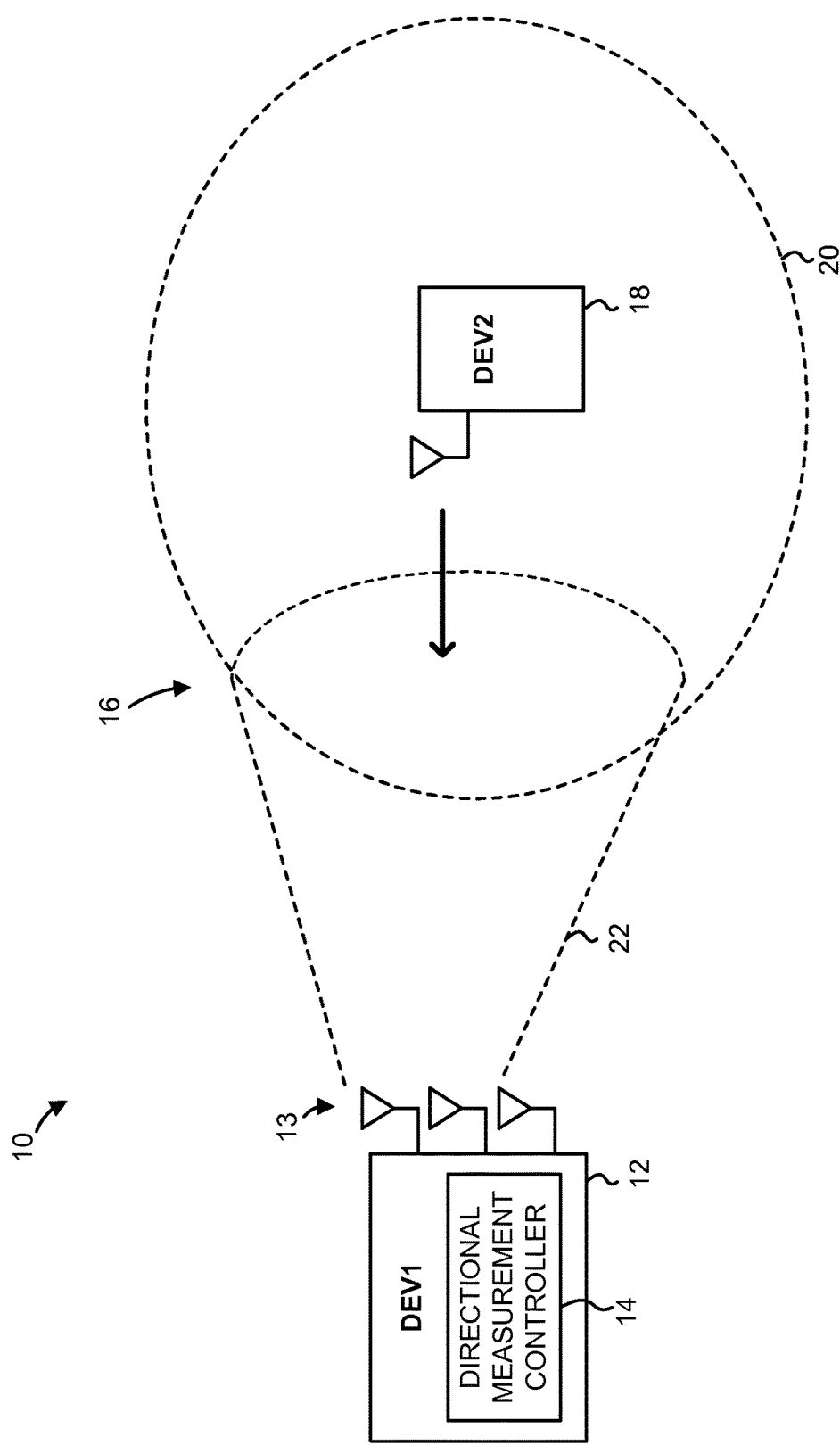
FIG. 1A is a block diagram of a communication system in which a device having a directional channel measurement module efficiently establishes a communication link with another device in accordance with one embodiment of the present disclosure.
Figure 1B:
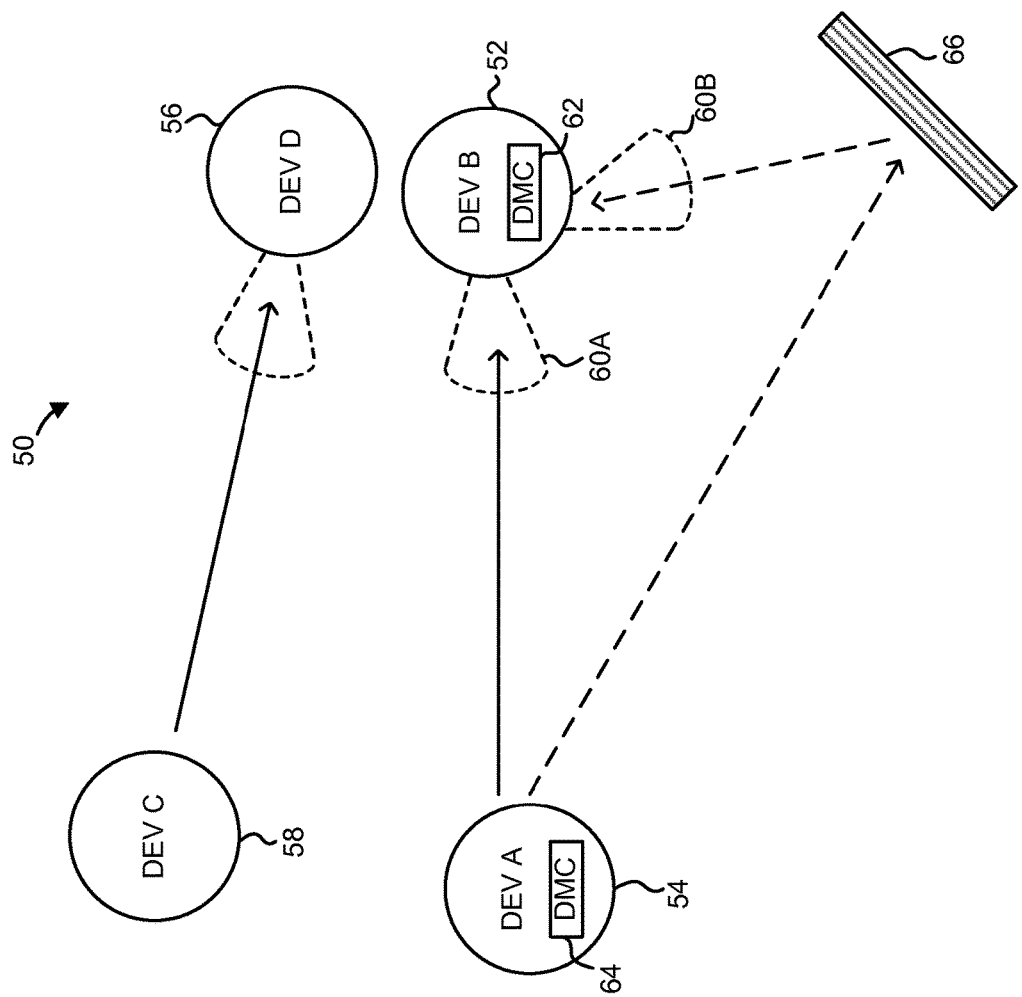
FIG. 1B is a block diagram of a communication system in which a pair of devices, in response to detecting directional interference, dynamically discover an alternative communication link that co-exists with the interfering link in accordance with one embodiment of the present disclosure.
Figure 1C:
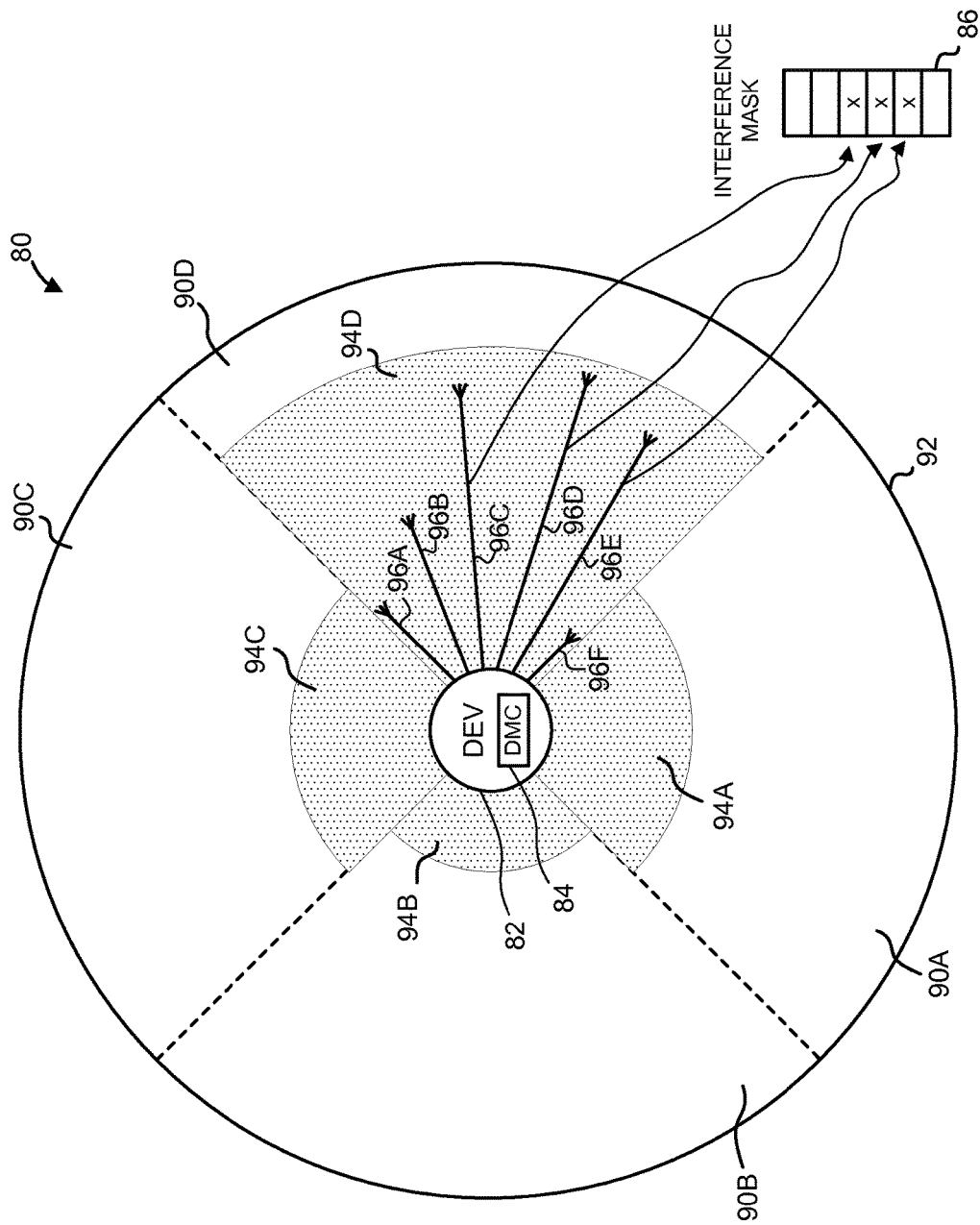
FIG. 1C is a block diagram of a communication system in which a device develops an interference mask to avoid sectors or directions associated with high levels of interference, in accordance with an embodiment of the present disclosure.

FIGS. 1A-C illustrate wireless communication systems in which communication devices use directional channel quality measurement techniques of the present disclosure to improve the ability of devices to receive intended transmissions from other devices on the one hand, and to filter out or otherwise avoid interfering signals on the other hand. Referring first to FIG. 1A, a wireless communication system 10 includes a communication device 12 equipped with an antenna array 13 and a directional measurement controller 14 to control measurements of the quality of a communication channel 16 along one or several directions, according to an embodiment of the present disclosure. Using techniques similar to those discussed herein, the directional measurement controller 14 improves sensitivity of the device 12 to transmissions of a device 18 and other communication devices active on a communication channel 16.

In an example configuration of the communication system 10, the device 18 operates as a piconet central point (PCP) that announces the presence of the system 10 to devices not yet associated with the system 10 by transmitting beacons. The device 12 in this configuration operates a station that utilizes the beacon data to become associated with the PCP 18 and, accordingly, the system or network 10. Depending on the scenario and/or embodiment, the device 12 conducts directional channel quality measurements when the device 12 is not yet associated with the PCP 18, when the device 12 is already associated with the PCP 18 but loses a beamformed link with the device 18, during a service period (SP) when the devices 12 and 18 exchange data along a beamformed link, or at another suitable operational state of the system 10.

In an example scenario, the device 18 transmits information via the communication channel 16 so that a device operating in an omni-directional receive (Rx) mode receives the transmitted information only within a range 20 (it is noted that some devices operate in a quasi-omni-directional mode which closely approximates an omni-directional mode. As used hereinafter, the term "omni-directional" encompasses quasi-omni-directional modes.) However, by conducting or responding to directional channel quality measurements, the device 12 disposed outside the range 20 receives the information transmitted from the device 18 and successfully establishes a communication link with the device 18. In the example of FIG. 1A, the device 12 detects the presence of the device 18 upon conducting a directional channel quality measurement (or a scan) along the direction associated with a gain pattern 22, illustrated for simplicity as a single high-gain lobe.

For brevity, directional channel quality measurements are referred to hereinafter as "directional measurements." In different modes or stages of operation, directional measurements correspond to different degrees of granularity, according to an embodiment. In an example scenario, a series of six "rough" directional measurements corresponds to six approximately 60-degree sectors of a circle with the device 12 at its center. In another example scenario, a series of four "refined" directional measurements corresponds to four relatively narrow or precise directions within a particular sector. The device 12, in an embodiment, conducts refined directional measurements following rough directional measurements. In a particular example, the device 12 makes a series of six rough directional measurements and chooses a "best" sector; then, the device 12 makes a series of four refined directional measurements within the rough sector and chooses a "best" narrow sector. Several other examples of selecting directions are discussed in more detail below.

In some embodiments, the communication device 12 locally measures the quality of the communication channel 16 for one or several directions and processes the directional measurements to determine the direction of a "good" signal the device 12 intends to receive, or of an interfering signal that prevents the device 12 from freely utilizing the entire spatial domain associated with the communication channel 16. To this end, the device 12 in one embodiment applies different steering vectors to the antenna array 13 as each directional measurement is conducted. In another embodiment, the device 12 receives a signal via the antenna array 13 and applies different steering vectors to the same received signal, sequentially or in parallel (if the device 12 is capable), to generate several directional measurements.

Generally speaking, any suitable technique for measuring channel quality along a certain direction can be used. Additionally, the device 12 in some embodiments develops statistical metrics based on quality metrics. Several example approaches to developing and using channel quality metrics are discussed in more detail with reference to FIGS. 3A-B.

In an embodiment, the device 12 conducts directional measurements in response to a request received from the device 18. In another embodiment, the device 12 additionally or alternatively conducts directional measurements according to a predefined schedule and/or upon failing to locate any devices in an omni-directional Rx mode.

In an embodiment, the device 12 conducts directional measurements locally and supplies the results to the device 18 (or another device) for further processing. Further, because directional measurements performed at the device 12 only reflect how the device 12 perceives the communication channel 16, the device 12 in some embodiments or modes of operation requests directional measurements from the device 18. Example information elements the devices 12 and 18 use to exchange directional measurement requests and responses are discussed in detail with reference to FIGS. 3A-6.

According to an embodiment, the device 12 uses directional channel quality measurements differently depending on the type of the detected signal (e.g., signal intended to be received, an interfering signal not intended to be received), as discussed in more detail below.

In another scenario illustrated in FIG. 1B, a communication system 50 includes two pairs of communicating devices, devices 52 and 54 defining a first pair and devices 56 and 58 defining a second pair, with the devices 52 and 56 disposed so that at least the device 58 generates interference on a beamformed communication link between the devices 54 and 52. In an embodiment, the device 52 has previously conducted beamforming training to develop an Rx steering vector associated with a receive gain pattern 60A. However, when the devices 56 and 58 exchange data, one or both of these devices effectively become a source of interference for the device 52. The interference can be particularly significant when the devices 52-58 use the same communication channel (e.g., same carrier frequency).

Rather than abandoning the communication channel on which interference has been detected, a directional measurement controller 62 of the device 52, in an embodiment, attempts to determine whether the interference is directional. In other words, the device 52 conducts directional measurements to determine whether the interference is approximately equal along every direction, or stronger along one direction relative to another direction. Upon determining that the interference is directional, the device 52 attempts to identify a new gain pattern 60B that results in a better reception on the same communication channel, in an embodiment. In the example configuration depicted in FIG. 1B, a fixture 66 such as a wall, for example, reflects the signal transmitted from the device 54 to define a signal propagation path that corresponds to the gain pattern 60B. Because the orientation of the gain pattern 60B makes the device 52 less susceptible to the interference from the device 56 as compared to the gain pattern 60A, the device 52 in this scenario switches to the Rx direction associated with the gain pattern 60B without changing the communication channel.

In some embodiments, the device 52 additionally communicates directional measurements to the device 54, and the device 54 updates the transmit (Tx) direction used for communicating with the device 52. In one such embodiment, the device 54 is equipped with a directional measurement controller 64 similar to the directional management controller 62. In another embodiment, the device 54 transmits in an omni-directional mode (if, for example, the device 54 is equipped with only one antenna).

According to another scenario, the device 52 operates in an omni-directional Rx mode prior to encountering interference due to the device 58. Similar to the scenario discussed above, the device 52 attempts to find a suitable Rx direction prior to switching to another communication channel. In both of these scenarios, the device 52 preserves the resources of the communication system 50 by not immediately "writing off" a communication channel on which interference has been detected. Moreover, when the device 52 successfully identifies the direction corresponding to the gain pattern 60B, the devices 52 and 54 do not need to exchange a relatively large amount of management information to negotiate a new communication channel.

Referring to FIG. 1C, a communication system 80 includes a device 82 in which a directional measurement controller 84 conducts a series of directional measurements to develop an interference mask 86 in accordance with an embodiment of the present disclosure. In some embodiments, the device 82 develops an interference mask for each communication channel on which the device 82 can potentially operate. Using the interference mask 86, the device 82 in various scenarios filters out certain rough or refined directions when receiving incoming frames, limits outgoing frames to those rough or refined directions that are not associated with strong interference, and otherwise adjusts or limits communications on the channel with which the interference mask 86 is associated. Generally speaking, the device 82 conducts directional measurements to develop an understanding of how one or several interference sources are oriented relative to the device 82. Conducting directional measurements to develop an understanding of how one or several interference sources are oriented relative to a device is referred to herein as "interference orientation."

In an embodiment, the device 82 measures the energy level of interference for each of the four sectors 90A-D of a circle 92 to approximately cover the space around the device 82. (It is noted that although the sectors 90A-D illustrate a two-dimensional partitioning of space, sectors can also correspond to three-dimensional slices of a spherical region, for example). In FIG. 1C, the energy level of an interfering signal (or multiple interfering signals) in each of the four sectors 90A-D is depicted as a respective shaded area 94A-D, with the area 94B indicating the lowest energy level, and the area 94D indicating the highest energy level. The device 82 in this example performs additional directional measurements along directions 96A-F to determine the energy level of the interfering signal within the "worst" sector 90D. A "worst" sector is a sector having a highest measured level of interference, in an embodiment. Measuring a level of interference is performed using any suitable interference level measurement technique.

As illustrated in FIG. 1C, the device 82 discovers that the interference is at its strongest along the directions 96C, 96D and 96E, and updates the interference mask 86 accordingly. In another embodiment, the device 82 maintains an interference mask similar to the interference mask 86 for the sectors 90A-D. In yet another embodiment, the device 82 maintains both a sector-level interference mask and one or several interference mask for refined directions within corresponding sector(s).

Figure 2:
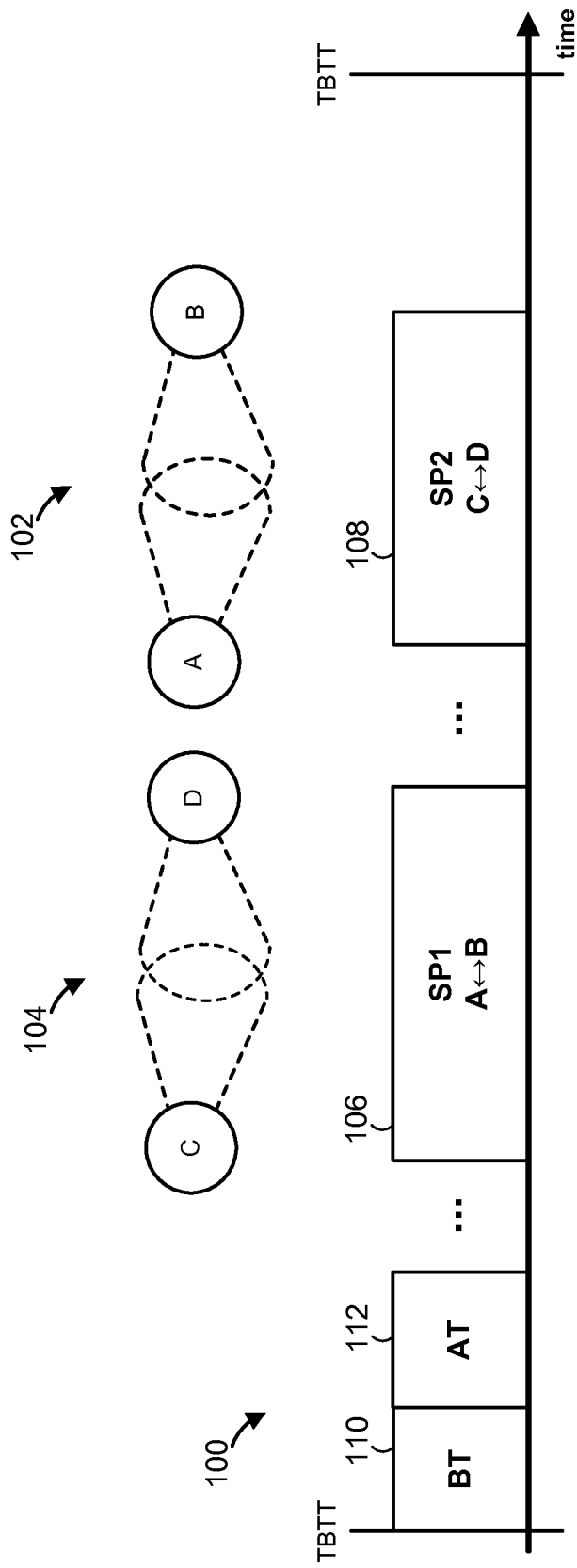
FIG. 2 is a diagram of a superframe in which two pairs of devices conduct channel quality measurements in respective service periods to enable spatial reuse of a shared communication channel.

Prior to a more detailed description of directional measurement techniques, a procedure for enabling spatial reuse of a communication channel using channel quality measurements along beamformed links or omni-directional links is discussed with reference to FIG. 2. In particular, FIG. 2 illustrates a communication schedule represented as a superframe 100 having several periods, referred to herein as "timeslots," serving different purposes, and two pairs of devices 102 and 104 that communicate on the same channel in accordance with the superframe 100. In general, a timeslot presents a transmission opportunity, a reception opportunity, or both to one or several devices. To determine whether the pairs of devices 102 and 104 can communicate on a certain channel at the same time, a PCP (not shown) allocates a first timeslot 106 during which the first pair of devices 102 exchanges information while the second pair of devices 104 measures the quality of the channel, and a second timeslot 108 during which the second pair of devices 104 exchanges information while the first pair of devices 102 measures the quality of the channel. If each pair of devices decides that the other pair of devices does not adversely affect the quality of the channel as perceived by the deciding pair of devices, the PCP determines that it can schedule both pairs 102 and 104 within the same timeslot. Otherwise, the PCP schedules communications between the pairs 102 and 104 during separate timeslots (or on separate channels, if available).

During the timeslot 106 or 108, the devices in the pair 102 or 104 measure the channel quality in an omni-directional mode if no beamforming has been performed prior to the timeslot 106 or 108. If, however, the pair 102 or 104 has previously conducted a beamforming session, the devices measure the channel quality in accordance with the steering vector developed during the beamforming session. Thus, unlike the techniques discussed with reference to FIGS. 1A-C, the technique illustrated in FIG. 2 does not include channel quality measurements along directions other than the direction that corresponds to the established beamformed link.

With continued reference to FIG. 2, the timing of the superframe 100 in an embodiment is established by the PCP, and is measured relative to a target beacon transmission time (TBTT). The time period between two adjacent TBTTs also can be referred to as beacon interval (BI). In addition to the timeslots 106 and 108, the superframe 100 includes a BT timeslot 110 and an announcement time (AT) timeslot 112. In some cases, the superframe 80 also includes an association beamforming training (A-BFT) timeslot, a data transmit time (DTT) timeslot, and a beamforming training time (BFTT) timeslot (none shown).

It is noted that the timeslots within the superframe 100 are not drawn to scale, and that the duration of each of the timeslots 106-112 can be configurable and/or implementation-dependent. Further, although the superframe 100 is illustrated in FIG. 2 with specific types of timeslots in a specific order, in various embodiments one or more additional types of timeslots are included, one or more illustrated timeslots are omitted, and/or the order of timeslots is different during a given beacon interval.

In one implementation, the BT timeslot 110 is used by the PCP to transmit discovery beacons. In addition to alerting stations proximate to the PCP of the presence of the PCP, data transmitted during the BT timeslot 110 is used for beamforming in some embodiments. In other words, beacons transmitted during the BT timeslot 110 are BFT units of a beamforming session set, in an embodiment. If a station is new to the network and is not yet beamformed, the station in some embodiments applies an omni-directional vector to its receive antenna set as each beacon is transmitted by the PCP during the BT timeslot 110. The new station then measures the quality of each received beacon (e.g., a signal to noise ratio (SNR), a bit error rate (BER), etc.), and uses the measurements in determining the best (or, at least, an acceptable) transmit beamforming sector/direction from the PCP Because the information transmitted during the BT timeslot 110 is primarily for use by unassociated devices, the PCP transmits data during this interval typically at a low data rate.

In an embodiment, the AT timeslot 112 is used by a PCP to announce timeslot allocation and scheduling information, for example, to stations already associated with the network. For example, the PCP, in one embodiment, indicates the types and corresponding start times of the timeslots 106 and 108. In general, the PCP exchanges management frames with one or several stations in the AT timeslot 112 related to scheduling of service periods, contention-based periods, BFT periods, etc., channel measurement, association information, and other data.

Next, example formats of information elements that devices exchange during a directional channel quality measurement procedure, according to some embodiments, are discussed with reference to FIGS. 3A-6. Unless otherwise indicated, in FIGS. 3A-6, the length in octets of a field or sub-field is listed below the field or sub-field. Examples of procedures in which these example information elements are exchanged are then discussed with reference to the timing diagrams in FIGS. 7 and 8.

First referring to FIG. 3A, an Enhanced Directional Channel Quality Request (hereinafter, for simplicity, "quality request") information element (IE) 150 includes several fields that allow a device to request one or several directional measurements from another device in an embodiment of the present disclosure. In some situations, a PCP transmits a communication frame including the quality request IE 150 to a station to determine how the station perceives a certain communication channel. In an embodiment, the PCP uses the quality request IE 150 to request directional measurements related to the currently operational channel shared by the PCP and the station. In another embodiment, the PCP uses this element to request directional measurements related to a channel other than the currently operational channel. Further, in some situations, a station transmits a frame including the quality request IE 150 to another station or a PCP.

Figure 3A:
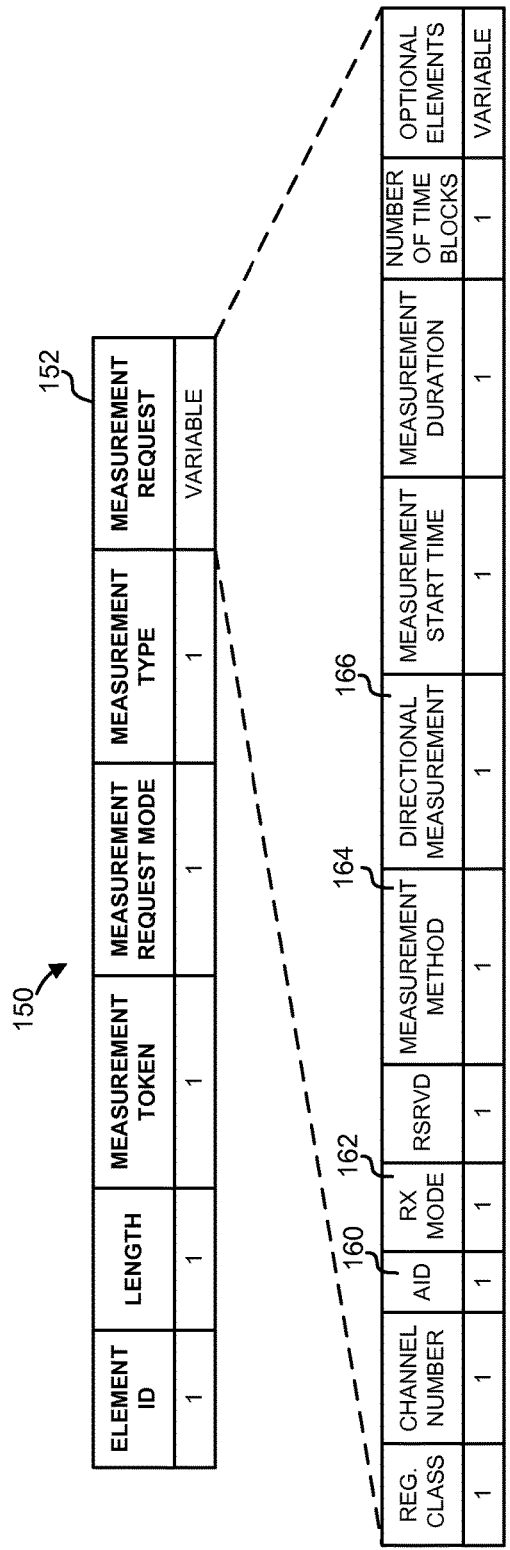
FIG. 3A is a diagram of an information element used to request a directional channel quality report in accordance with an embodiment of the present disclosure.

FIG. 3A illustrates, in a block format, different fields of the quality request IE 150 and lists the length of the fields (in octets) in one example implementation of the quality request IE 150. It is noted that the ordering as well as the length of the fields vary according to different embodiments. Moreover, some other embodiments of the quality request IE 150 omit some of the fields illustrated in FIG. 3A and/or include additional fields. In the discussion below, a device that transmits the quality request IE 150 is referred to as a requesting device, and the device that receives and processes the quality request IE 150 is referred to as a processing device.

In the example of FIG. 3A, the quality request IE 150 includes an Element Identifier (ID) field to identify the information element as a quality request IE, a Length field to indicate the length of the quality request IE 150, and several fields to specify management data and measurement selection data. As illustrated in FIG. 3A, a Measurement Request field 152 has several sub-fields including an Association Identifier (AID) field 160 that specifies an address of a device (e.g., a station, a PCP) relative to which the processing device is being requested to conduct one or several directional measurements. A certain value of the AID field 160, e.g., 0 or 255, is interpreted as broadcast identity to refer to every device active on the network, in accordance with an embodiment.

The Measurement Request field 152 also includes an Rx Mode field 162 to specify whether the processing device should perform channel quality measurements in a quasi-omni mode, a directional mode, or a beamformed mode. In an embodiment, the quasi-omni mode generates a relatively low Rx gain, and is useful for measuring channel quality in an omni-directional Rx mode in the presence of strong intended ("good") signal or strong interference signals, for example; the directional mode generates a medium or high Rx gain, and is useful for measuring channel quality along one or several rough (sectored) directions in the presence of relatively weak intended signals or interference signals, for example; and the beamformed mode generates a high Rx gain, and is useful for measuring channel quality along the Rx direction of a beamformed link to assess potential effects of interference on the beamformed link. Table 1 below lists several combinations of values of the fields 160 and 162 along with a description of the relevance of these values in an embodiment of the present disclosure.

TABLE 1

| Rx Mode | AID | Description |
| --- | --- | --- |
| Quasi-omni | BroadcastID | Channel quality measurements in a quasi-omni Rx direction |
| Directional | BroadcastID | Channel quality measurements in all (sectored) Rx directions |
| Directional | device ID | Channel quality measurements in a rough (sectored) Rx direction that covers the beamformed direction of the device identified by AID |
| Beamformed | BroadcastID | Channel quality measurements on all beamformed links |
| Beamformed | device ID | Channel quality measurements on a beamformed link to the device identified by AID |

Figure 3B:
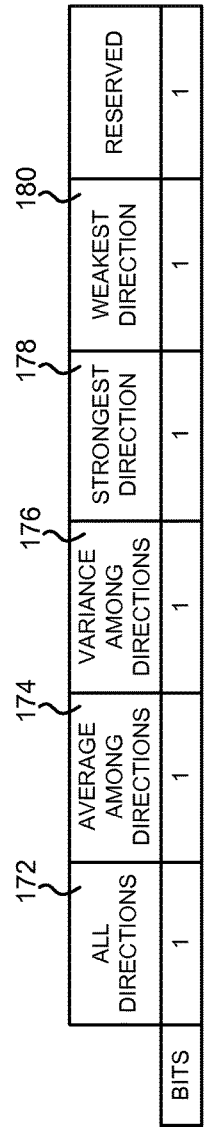
FIG. 3B is a diagram of a bit mask used with the information element of FIG. 3A in accordance with an embodiment of the present disclosure.

With continued reference to FIG. 3A, the Measurement Request field 152 further includes a Measurement Method field 164 to identify the desired mode of measuring energy on the communication channel, and a Directional Measurement field 166 to identify the type of the desired energy metric. In an embodiment, device support such energy measurement modes as Received Channel Power Indication (RCPI), Average Noise Power Indication (ANPI), Receive Signal to Noise Indication (RSNI), etc. Further, FIG. 3B illustrates an example bitmask 170 used to populate the field 166 in an embodiment of the present disclosure. When activated, a flag 172 indicates that a measurement of energy received from all directions on a particular channel should be included in a response to the requesting device. A flag 174 specifies whether an average of measurements of energy received from multiple directions should be included in the response. Further, a flag 176 specifies whether a variance of measurements of energy received from multiple directions should be included in the response, and flags 178 and 180 specify whether the strongest and weakest measurements, respectively, should be included in the response following measurements for a plurality of Rx directions. Thus, in some embodiments, the fields 164 and 166 together determine the type of channel quality indicators to be included in a response to the quality request IE 150.

Referring back to FIG. 2, the pairs of devices 102 and 104 in an embodiment implement a quality request IE similar to the quality request IE 150, except that the fields 162 and 166 are omitted. As a result, devices can only carry out measurements in the direction determined during a prior beamforming session (e.g., the direction of the station that transmitted the request) or in an omni-directional Rx mode, in an embodiment. Thus, the information specified in the quality request IE 150 of FIG. 3A allows devices to request directional measurements in various directions and according to different measurement modes.

Figure 4:
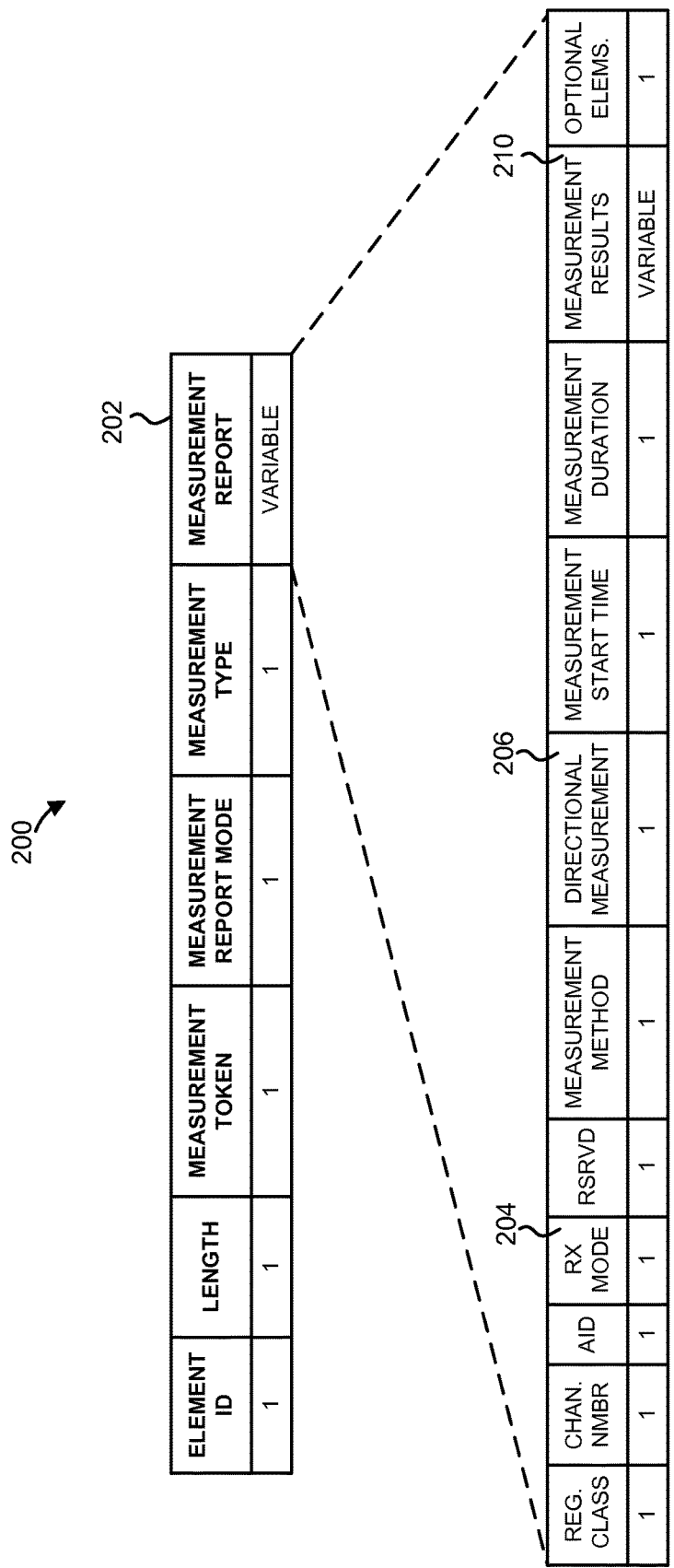
FIG. 4 is a diagram of a Directional Channel Quality Report information element (IE) used to report a directional channel quality data in accordance with an embodiment of the present disclosure.

Now referring to FIG. 4, the processing device replies to the quality request IE 150 with a frame that includes an Enhanced Directional Channel Quality Report (hereinafter, "quality report") IE 200 in accordance with an embodiment. Several fields of the quality report IE 200 are similar to the corresponding fields of the quality request IE 150. However, the quality report IE 200 includes a Measurement Report field 202 to provide the results of directional measurements to the requesting device. The field 202 includes an Rx Mode field 204 and a Directional Measurement field 206 which the receiving device sets to the same values as specified in the fields 162 and 166 respectively by the requesting device. Additionally, the Directional Measurement field 206 includes a variable-length Measurement Results subfield 210 that lists one or several channel quality indicators as specified by the fields 204 and 206.

Figure 5:
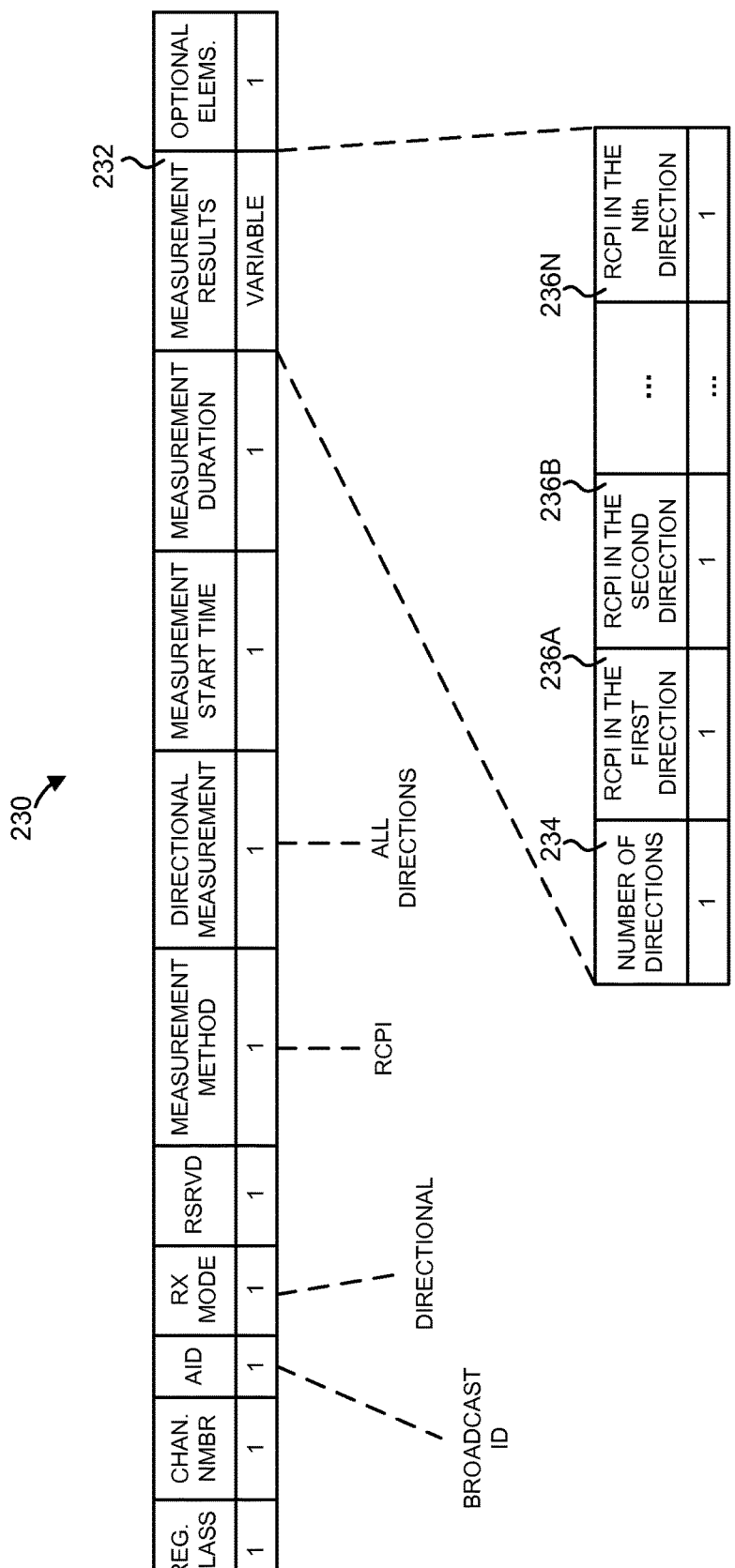
FIG. 5 is a diagram of a Measurement Report IE that includes Received Channel Power Indication (RCPI) measurements for N directions in accordance with an embodiment of the present disclosure.

FIG. 5 illustrates an example measurement report IE 230 that is in response to a request IE 150 in which the AID corresponds to broadcast, and the Rx Mode field indicates a directional measurement. In an embodiment, the AID and Rx Mode fields are interpreted as indicated in Table 1, and, accordingly, the receiving device reports channel quality measurements in all sectored Rx directions using the IE 230. In an embodiment, there is a total of four Rx directions corresponding to four sectors of a circle (see e.g., FIG. 1C). Further, the Measurement Method field specifies RCPI, and the value of the flag 172 in the Directional Measurement field indicates that energy measurements in all directions are requested. In this example, a Measurement Results field 232 includes a sub-field 234 that specifies the number N of measurements to follow, and N sub-fields 236A-N listing respective RCPI measurements for each of N directions.

Figure 6:
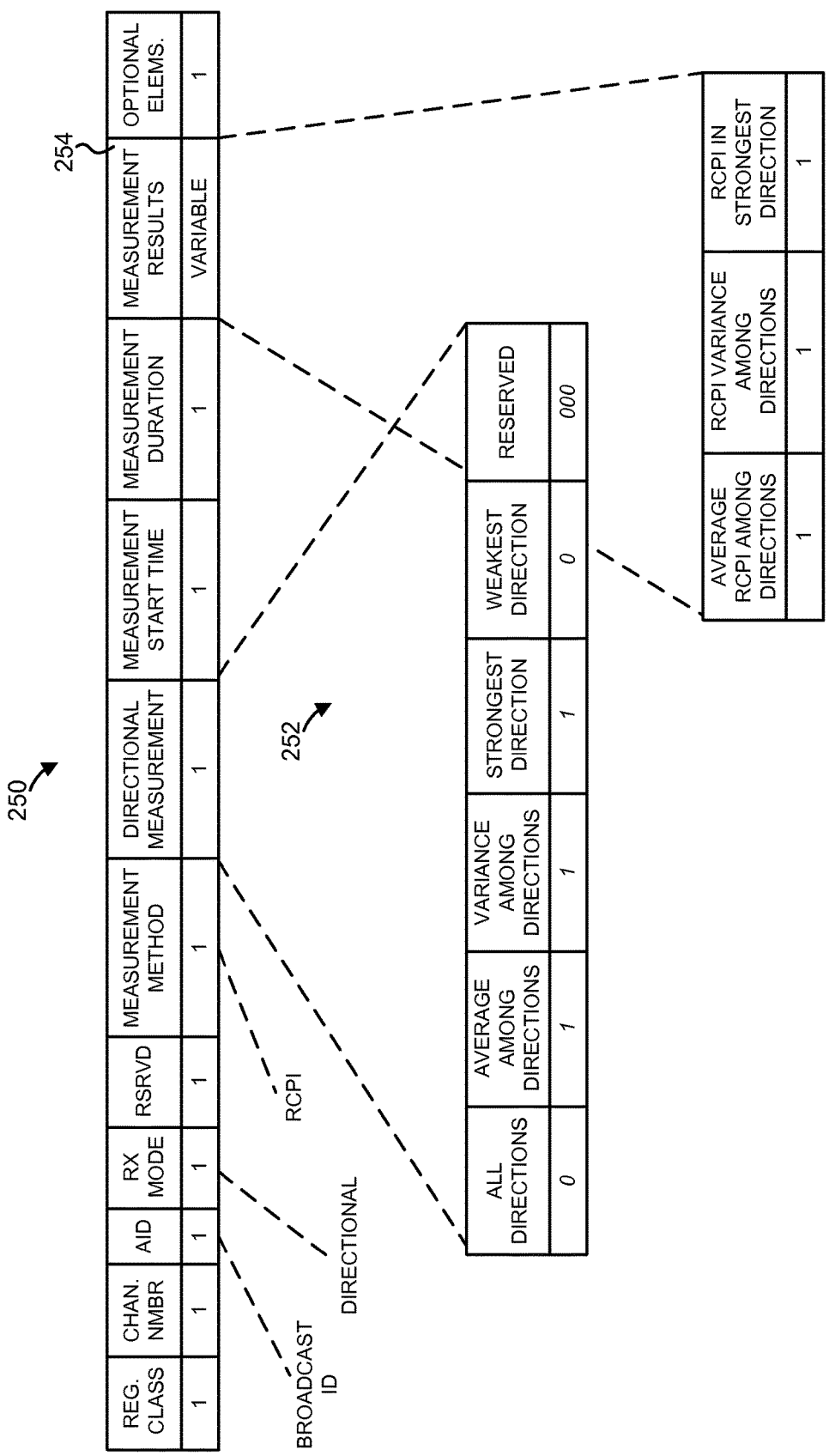
FIG. 6 is a diagram of a Measurement Report IE that includes statistical data related to several RCPI measurements in accordance with an embodiment of the present disclosure.

As another example, FIG. 6 illustrates a measurement report IE 250 that, similar to the measurement report IE 230, is in response to a request IE 150 in which the AID corresponds to broadcast, the Rx Mode field indicates a directional measurement, and the Measurement Method field specified RCPI. However, rather than reporting measurements for all directions as in the measurement report IE 230, a bitmask 252 included in the Directional Measurement field indicates a report of an average among directions metric, a variance among directions metric, and a strongest direction measurement (in FIG. 6, example values of flags are listed in italics, and length in octets is listed in normal font below the corresponding field or sub-field). As further illustrated in FIG. 6, a measurement results field 254 includes three sub-fields for the three requested metrics: an average RCPI measurement among the requested directions (in this case, all sectors per the AID field), a variance of RCPI measurement among the requested directions, and the strongest obtained RCPI measurement among the requested directions.

In some embodiments, the Rx Mode field and the AID field are used in measurement request and measurement report elements or fields (such as the fields 152, 202, and 232) and in individual request and report fields such as Clear Channel Assessment (CCA) requests and reports, RPI histogram requests and reports, Noise histogram requests and reports, channel load requests and reports, etc. In general, devices can use the Rx Mode field and the AID field to conduct any kind of channel quality measurements associated with a particular direction, several directions, or all directions, and report the measurements for a particular mode of measuring energy associated with a particular direction, several directions, or all directions.

Generally with respect to FIGS. 3A-6, a requesting device in one embodiment specifies the Rx direction for assessing channel quality by setting the AID field to a certain value to select broadcast, by setting the AID field to a sector index number if the Rx Mode field indicates a directional mode, and setting the AID field to the identity of a target device if the Rx Mode field indicates a beamformed mode. In other words, the processing device in this embodiment interprets the AID field in view of the value of the Rx Mode field. In another embodiment, the Measurement Request field 152 includes a Measurement Rx Direction subfield which the requesting device sets to an index of an Rx steering vector, or an index of an antenna weight vector (AWV), an RX steering vector, an AWV, etc., regardless of the selection indicated in the Rx Mode field. In an example configuration, devices operating in a communication system share a codebook in which steering vectors are indexed in the same uniform manner, and a requesting device unambiguously specifies a direction by specifying the index of a steering vector. It is noted that using the Measurement Rx Direction subfield, the requesting device can request another device to conduct directional measurements and report directional measurements for specific Rx directions.

Figure 7:
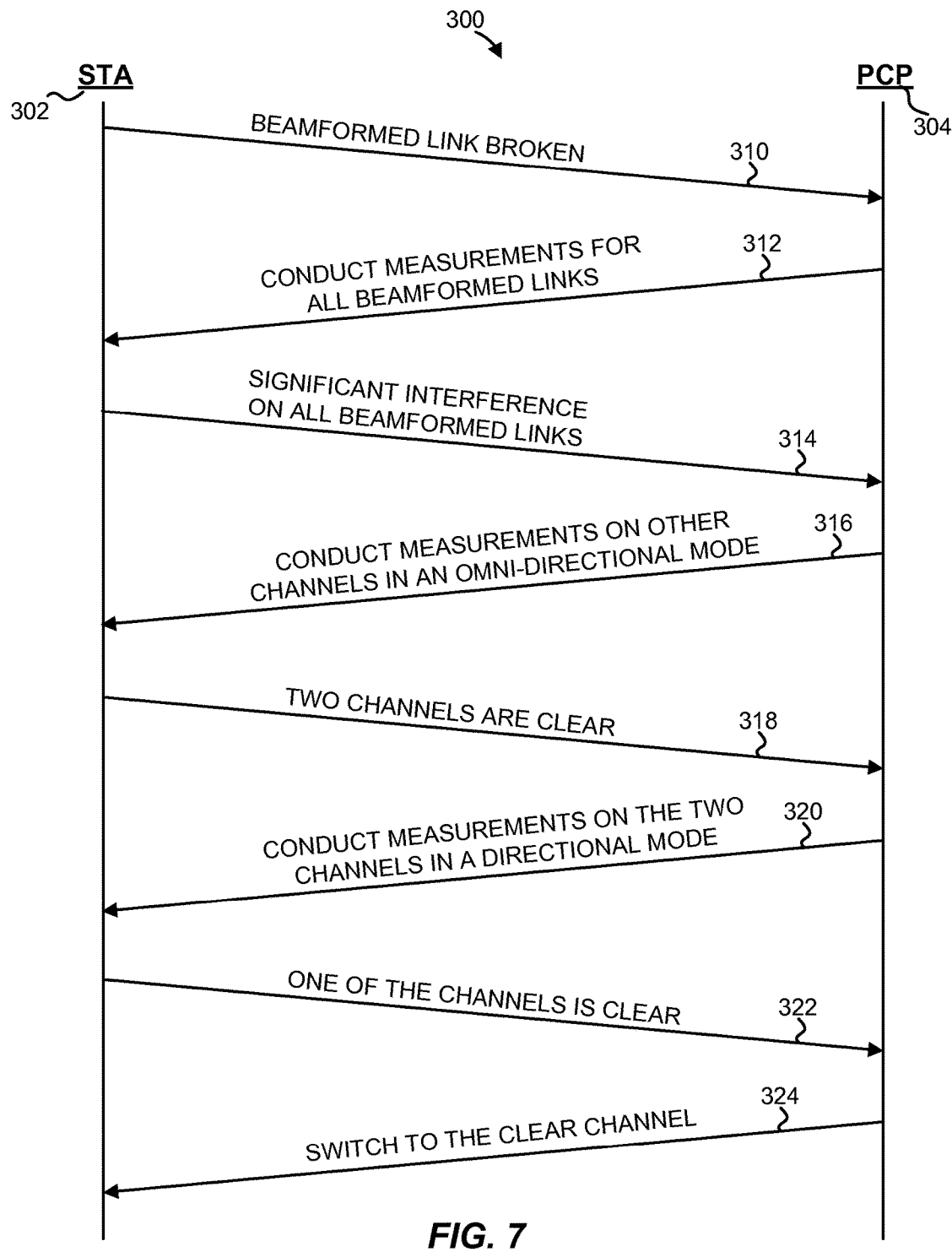
FIG. 7 is a messaging diagram that illustrates an example information exchange between a station and a piconet central point (PCP) to implement a directional channel measurement procedure in accordance with an embodiment of the present disclosure.

FIG. 7 is a messaging diagram that illustrates a data exchange between a station 302 and a PCP 304 in an example scenario 300 that involves directional channel quality measurement. The scenario 300 begins with the station 302 transmitting a communication frame or message 310 to the PCP 304. The message 310 reports that a beamformed link between the station 300 and another device (e.g., another station) is experiencing significant interference, for example. In response, the PCP 304 transmits a request 312 to the station 302 to measure the quality of the channel on all beamformed links available to the station 302. The request 312, in an embodiment, includes the quality request IE 150 discussed above. In some cases, the PCP 304 also receives a message similar to the message 310 from a device with which the station 302 communicated via the link identified in the message 310, i.e., a peer of the station 302. In an embodiment, the PCP 304 conducts a message exchange with the peer substantially in parallel with the message exchange of the scenario 300. The message exchange with the peer can be generally similar to the message exchange of the scenario 300.

Upon receiving and processing the message 312, the station 302 conducts channel quality measurements for all beamformed links on the same communication channel with which the now-broken link is associated. In the example scenario of FIG. 7, the station 302 determines that significant interference is present on all beamformed links. In other words, the interference is not directional (or, at least, not sufficiently directional so as to justify a search for another receive and/or transmit direction on the communication channel). The station 302 reports the results of the measurements conducted on the beamformed links in a message 314 that includes the measurement report IE 200, in accordance with one embodiment.

With continued reference to FIG. 7, the PCP 304 next transmits a message 316 to the station 302 to request that the station 302 conduct omni-directional measurements on other communication channels (e.g., carrier frequencies). In an embodiment, the message 316 includes the quality request IE 150. The station 302 conducts omni-directional measurements on the other channel; discovers, in this example scenario, that two channels are clear; and reports that two channels are clear (as measured in an omni-directional mode) to the PCP 304 in a message 318. However, because a source of directional interference can effectively prevent reception along certain directions at the station 302 while appearing as a relatively weak source of interference in an omni-directional Rx mode, the PCP 304 next asks the station 302 to conduct directional measurements on the two clear channels (message 320). Similar to the message 312 or 316, the message 320 in some embodiments includes the quality request IE 150. In an embodiment, the station 302 conducts one or several directional measurements in a sector that includes the direction of the now-broken beamformed link. In another embodiment, the station 302 selects several directions in view of the direction of the now-broken beamformed link (e.g., the sector that includes the broken beamformed link and the adjacent sectors, or several refined directions within the sector that includes the broken beamformed link). In yet another embodiment, the station 302 conducts directional measurements according to a pre-defined scheme regardless of the quality request IE 150.

After conducting the directional measurements in accordance with information in the quality request IE 150 or a predefined scheme, the station 302 transmits a message 322 to report that one of the two channels is clear as measured both in an omni-directional mode and in a directional mode. Upon receiving the message 322, the PCP 304 checks whether the channel identified as clear is available for use by the station 302 and, in the scenario 300, transmits a message 324 that includes a permission to establish a communication link on the identified clear channel as a replacement for the broken beamformed link.

Figure 8:
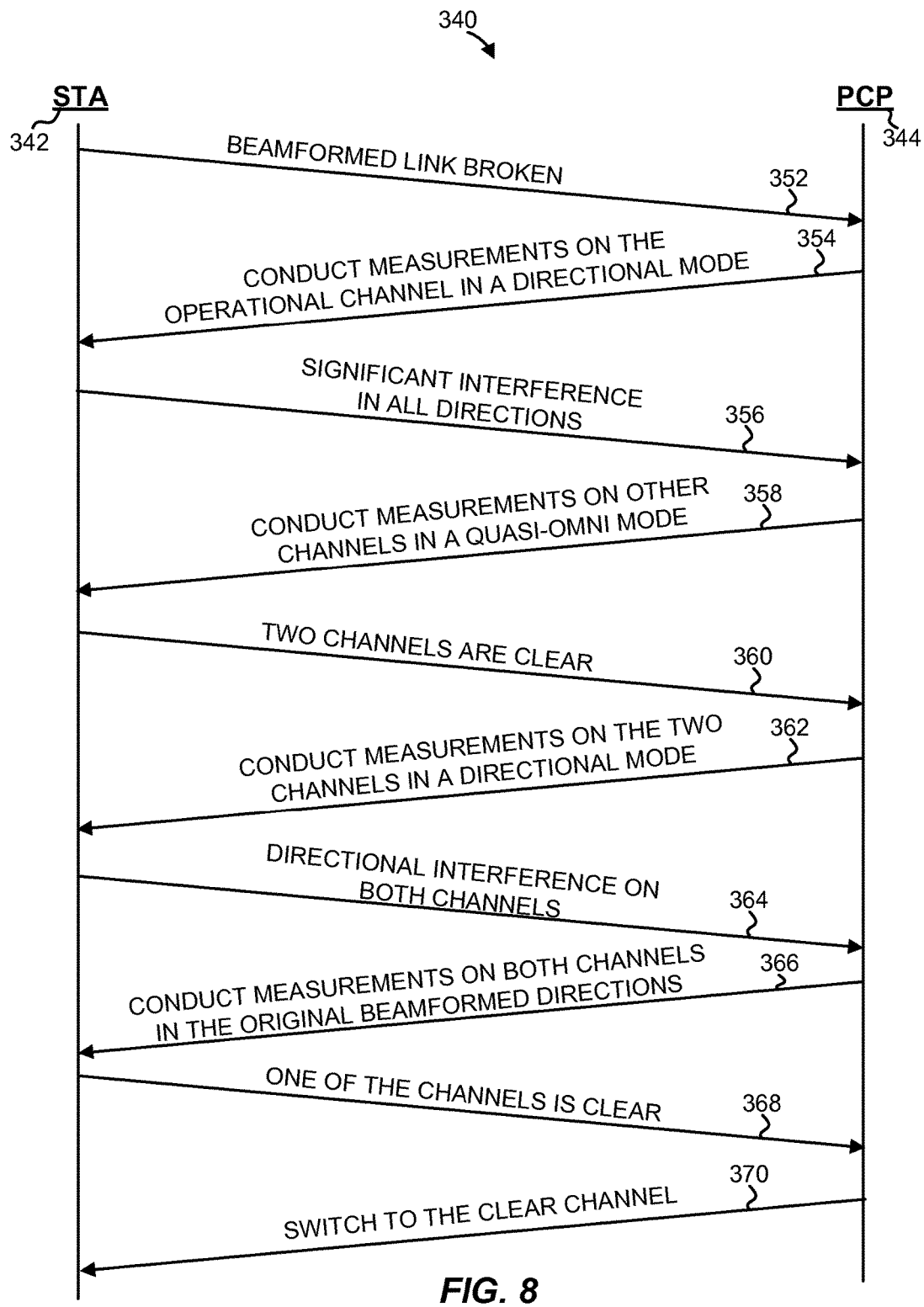
FIG. 8 is a messaging diagram that illustrates another example information exchange between a station and a PCP to implement a directional channel measurement procedure in accordance with an embodiment of the present disclosure.

FIG. 8 is a messaging diagram that illustrates a data exchange between a station 342 and a PCP 344 in an example scenario 340 that also involves directional channel quality measurement. Several stages of the scenario 340 are similar to the scenario 300 discussed above. In particular, the messages 352-362 are similar to the messages 310-320 in content, direction, and ordering. However, following a measurement session triggered by the message 362, the station 342 determines that directional interference is present on both channels. In response, the PCP 344 requests that the station 342 conduct channel quality measurements on both channels along the direction of the broken beamformed link.

As a more specific example, the station 342 conducts rough (or sectored) directional measurements in response to the message 362. Referring back to FIG. 1C, a high energy level of an interfering signal as measured for a particular sector is not necessarily associated with a high energy level of the interfering signal for each refined direction within the sector. Thus, although the station 342 failed to identify a sector in which the level of interference is acceptable on either one of the two channels, the station 342 now conducts directional measurements in the direction associated with the broken beamformed link and, in this example scenario, successfully identifies a channel on which this direction can be used. The station 342 reports that one of the channels is in fact clear along the direction of the broken beamformed link in a message 368, and the PCP 344 responds with a permission to switch to the clear channel in a message 370.

Next, several example applications of directional measurement techniques during beamforming training are discussed with reference to FIGS. 9 and 10. As a preliminary matter, it is noted that beamforming training sometimes is conducted in the presence of interfering signals. However, concurrent communications between other devices can interfere with an ongoing beamforming training session (conversely, a beamforming training session can also become a source of interference relative to communicating stations). It is difficult to match the timing of beamforming training with these sources of interference. Moreover, as discussed above, sometimes there are sources of interferences that are unknown and unpredictable. Because a beamforming training session in some situations is conducted when interference is present while in other situations is conducted when the one or more interference sources are silent, devices discussed with reference to FIGS. 9 and 10 develop beamforming links that spatially co-exist with interference sources regardless of whether these sources are active during a beamforming training session.

Figure 9:
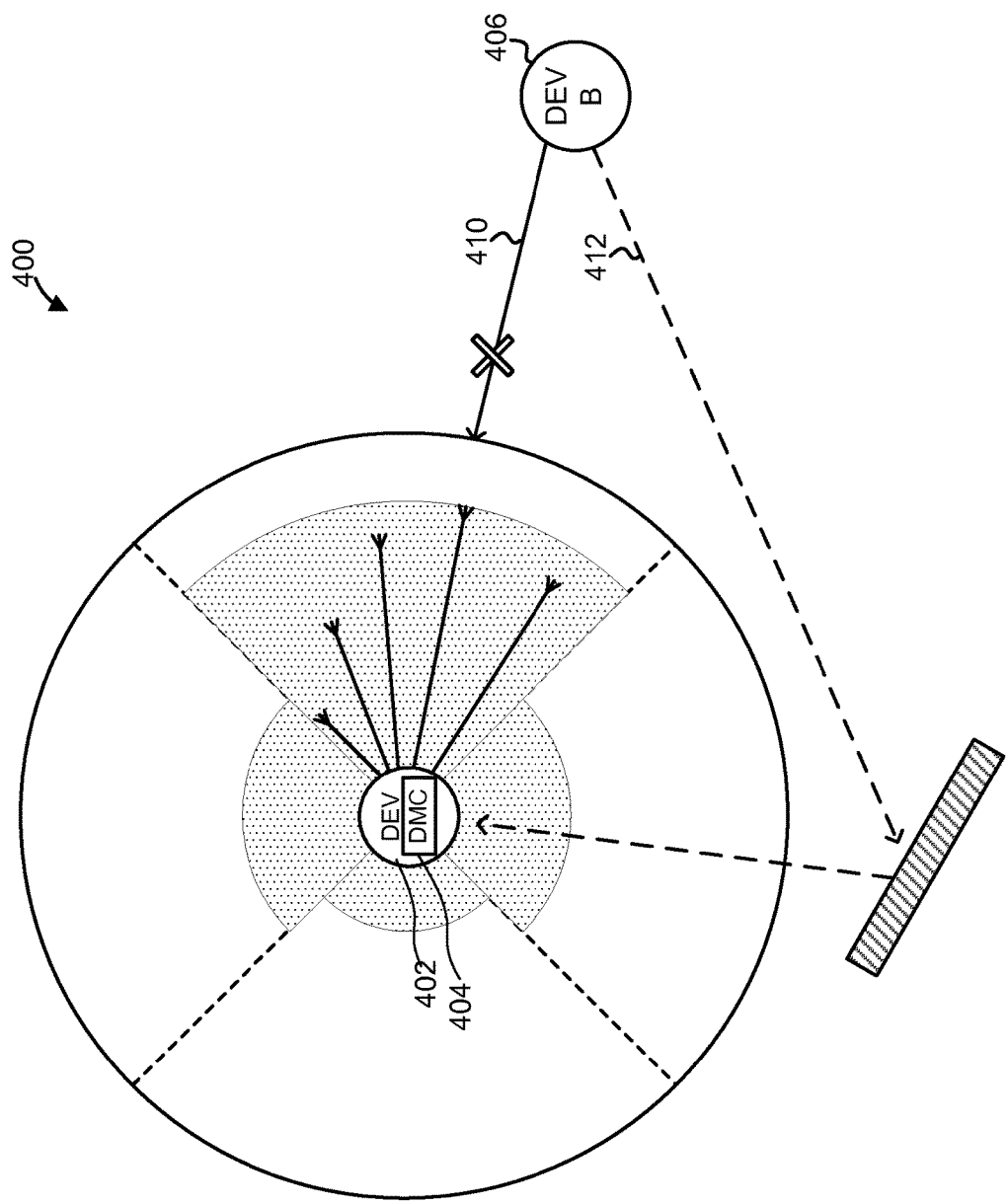
FIG. 9 is a block diagram of a communication system in which a device uses an interference mask during beamforming training, in accordance with an embodiment of the present disclosure.

Referring first to FIG. 9, a communication system 400 includes a device 402, equipped a directional measurement controller 404, that develops an interference mask similar to the mask 86 illustrated in FIG. 1C during an interference orientation session. During a subsequent beamforming training session with a device 406, the device 402 applies the interference mask to filter out sectors and/or refined directions on which significant interference has been detected. Thus, as illustrated in FIG. 9, the device 402 restricts beamforming training to a direction 412 and does not conduct beamforming training in a direction 410. In an embodiment, rather than filtering out an entire sector, the device 402 filters out one or several directions within a sector based on the relative intensity of interference. In different embodiments, the device 402 uses the results of interference orientation during receive beamforming training during which a steering vector for incoming communications is developed, transmit beamforming training during which a steering vector for outgoing communications is developed, or both. Moreover, the device 402 in some embodiments also applies the interference mask when transmitting beamforming training frames to a peer device during a beamforming training session of the peer device.

Thus, the device 402 conducts beamforming training and interference orientation separately, and subsequently combines the results of beamforming training and interference orientation to derive an interference-resistant beamformed link. In some embodiments, the device 402 develops an interference-resistant beamformed link when establishing an initial connection with another device. In other embodiments, the device 402 develops an interference-resistant beamformed link after losing a beamformed link due to interference. In some of these embodiments, the device 402 initiates a new beamforming training session by transmitting the appropriate request to a peer device (e.g., the device 406).

Figure 10:
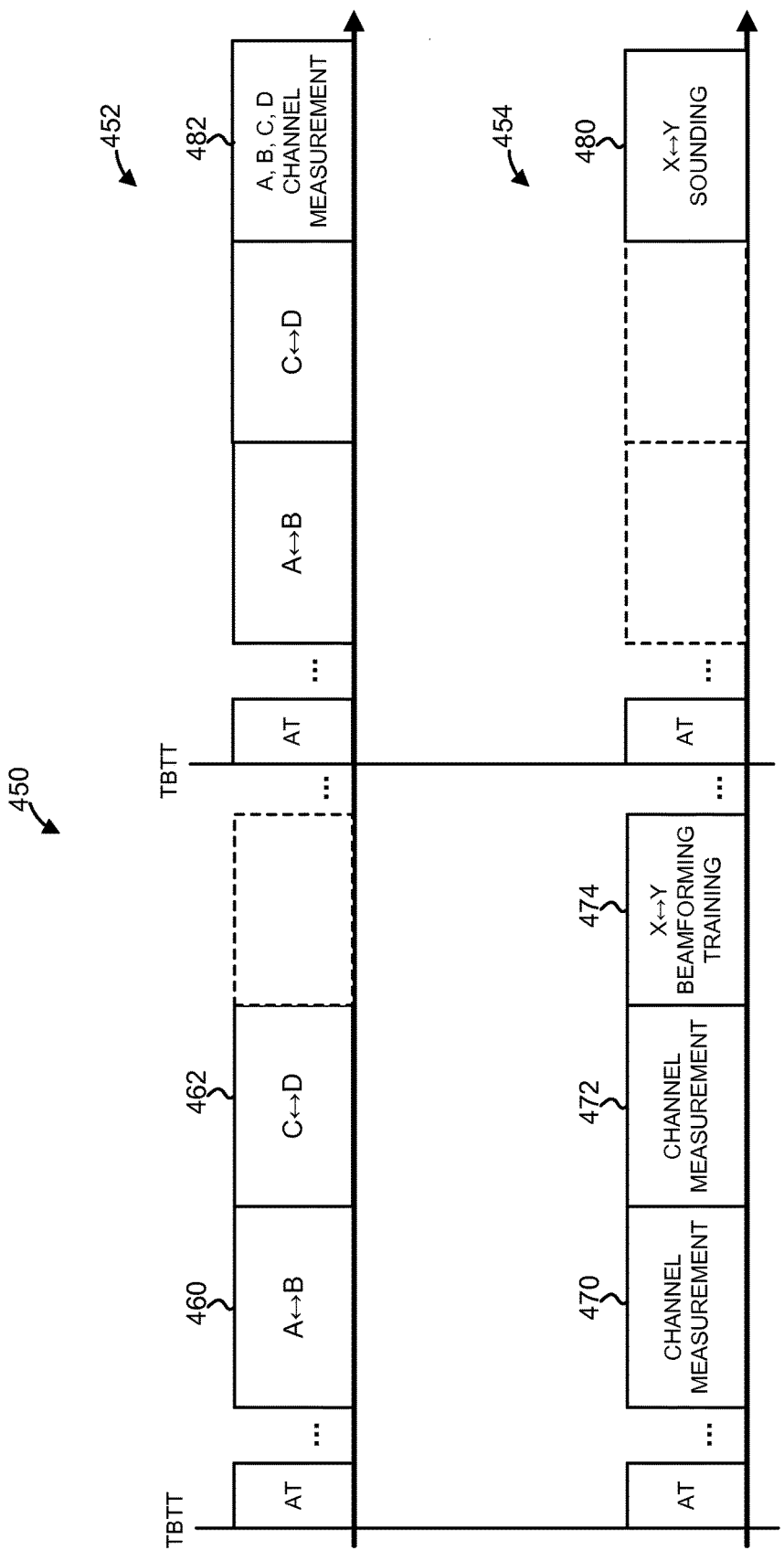
FIG. 10 is a diagram of a schedule in which a pair of device conducts interference orientation and beamforming training in respective time periods to develop a beamforming link that can co-exists with the existing communication links, in accordance with an embodiment of the present disclosure.

Referring to FIG. 10, a schedule 450 includes concurrent superframes 452 and 454. A first pair of devices A and B, and a second pair of devices C and D communicate during respective service periods 460 and 462 during a first beacon interval. During the service periods 460 and 462, each of a third pair of devices X and Y conduct interference orientation to determine whether communications between the devices A, B, C, and D appear as interference to the device X and Y. In the superframe 454, the timeslots 470 and 472 are concurrent with the service periods 460 and 462 and are used for omni-directional and directional measurements. In an embodiment, the devices X and Y conduct directional measurements to determine whether the interference from the devices A-D, if any, is directional and can therefore be avoided along certain directions.

Next, the devices X and Y conduct beamforming training in a timeslot 474 in view of the results of interference orientation conducted during the timeslots 470 and 472. In this manner, the devices X and Y develop a beamforming link that will permit the devices X and Y to avoid interference due to other traffic on the communication network.

In an embodiment, during a timeslot 480 scheduled in the next beacon interval, for example, the devices X and Y exchange sounding frames while some or all of the devices A, B, C, and D conduct omni-directional or directional channel quality measurements in timeslot 482 to determine whether the pair X, Y is an interference source relative to the pair A, B and/or C, D.

Figure 11:
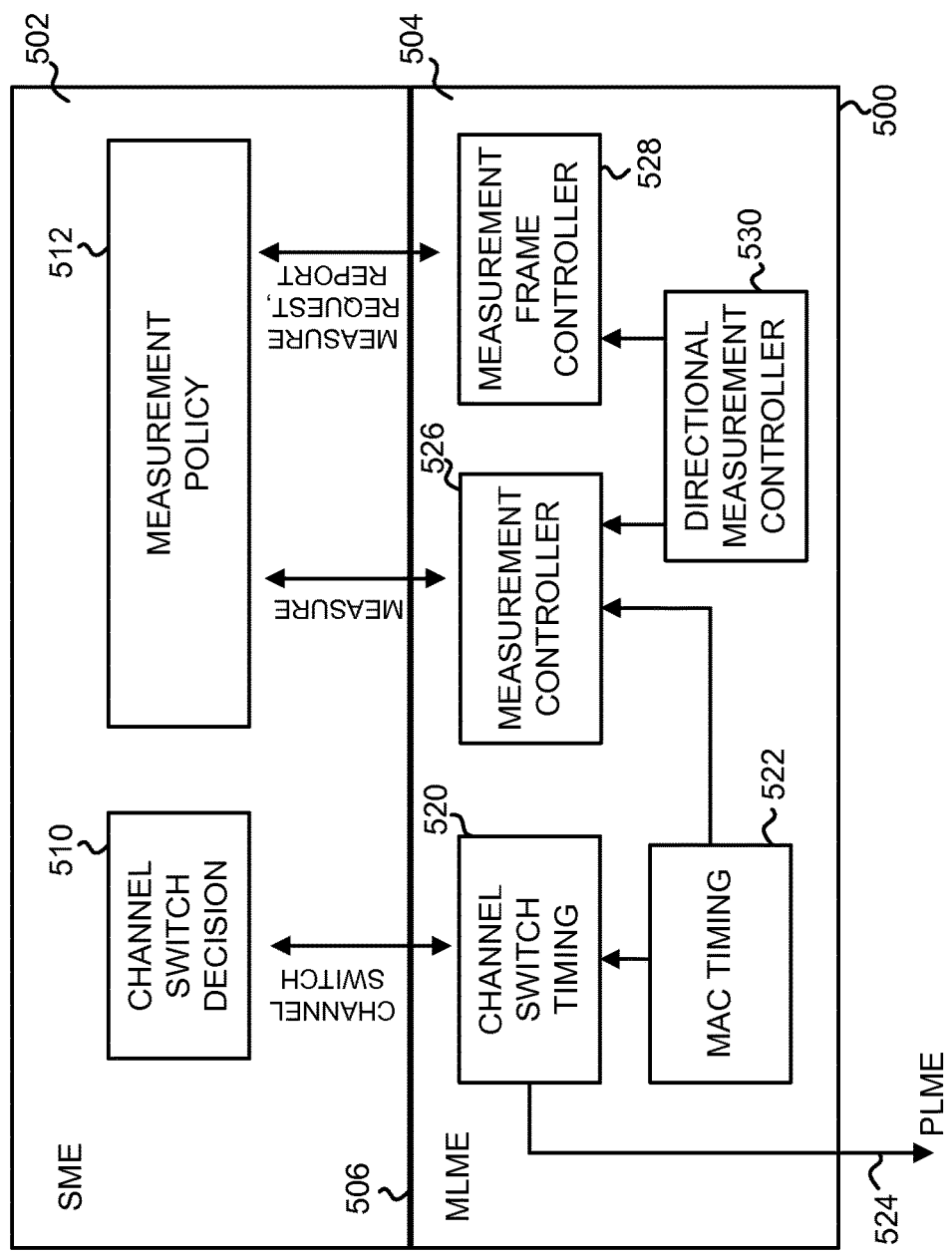
FIG. 11 is a block diagram of a spectrum management protocol layer controller capable of controlling directional measurements in accordance with an embodiment of the present disclosure.

Now referring to FIG. 11, an example spectrum management protocol layer controller 500 includes a Station Management Entity (SME) 502 and a Media Access Channel (MAC) Sublayer Management Entity (MLME) 504. In an embodiment, the controller 500 is implemented as a chip or a portion of a chip and used in a device similar to the device 12, 52, 82, and/or 402, for example. The SME 502 includes a channel switch decision controller 510 to control the selection of a communication channel and exchange channel switching control data via the MLME 504 via the SME/MLME interface 506. The SME 502 also includes a measurement policy controller 512 to specify when channel quality should be measured, which channels should be measured, and initiate channel quality measurement requests and responses to be transmitted to another device. Similar to the channel switch decision controller 510, the measurement policy controller 512 interacts with the MLME 504 via the SME/MLME interface 506.

The MLME 504 includes a channel switch timing controller 520 coupled to a MAC timing controller 522 and to the SME/MLME interface 506. In response to commands from the channel switch decision controller 510, the channel switch timing controller 520 generates appropriate commands for a Physical Layer Management Entity (PLME) and transmits these commands via a PLME control line 524.

Further, in an embodiment, a measurement controller 526 controls channel quality measurements local to a device that includes the controller 500, and a measurement frame controller 528 controls generation of requests to other stations to conduct channel quality measurements. To this end, the measurement controller 516 calculates one or more of RCPI, ANPI, RSNI, etc. and the corresponding statistical metrics (e.g., variance, average). A directional measurement controller 530 in some embodiments is generally similar to the directional measurement controller 14, 62, 84, or 404. In the example of FIG. 11, the directional measurement controller 530 is coupled to the measurement controller 526 and the measurement frame controller 528. In operation, the directional measurement controller 530 controls the timing and the selection of local directional measurements such as those discussed with reference to FIG. 3A, for example. In some embodiments, the directional measurement controller 530 further generates information elements such as the quality request IE 150 and/or the quality report IE 200.

In an embodiment, the directional measurement controller 530 further controls PCP decisions related to omni-directional and directional measurements reported by a station (see, e.g., FIGS. 7 and 8). Thus, when a device operates as a PCP, the directional measurement controller 530 in some embodiments determines whether a request should be transmitted to a station asking the station to conduct a directional measurement on the same channel, an omni-directional measurement on a different channel, etc. to trigger messages such as the message 312 or 316, for example. On the other hand, when a device operates as a station, the directional measurement controller 530 in some embodiments processes messages such as the message 312 or 316, and causes the device to conduct channel quality measurements in accordance with the processed message.

In some embodiments, the spectrum management protocol layer controller 500 is used in such as devices as the device 12, 52, 82, or 402, for example. In some of these embodiments, the directional measurement controller 530 is used as the directional measurement controller 14, 62, 84, or 404.

Figure 12:
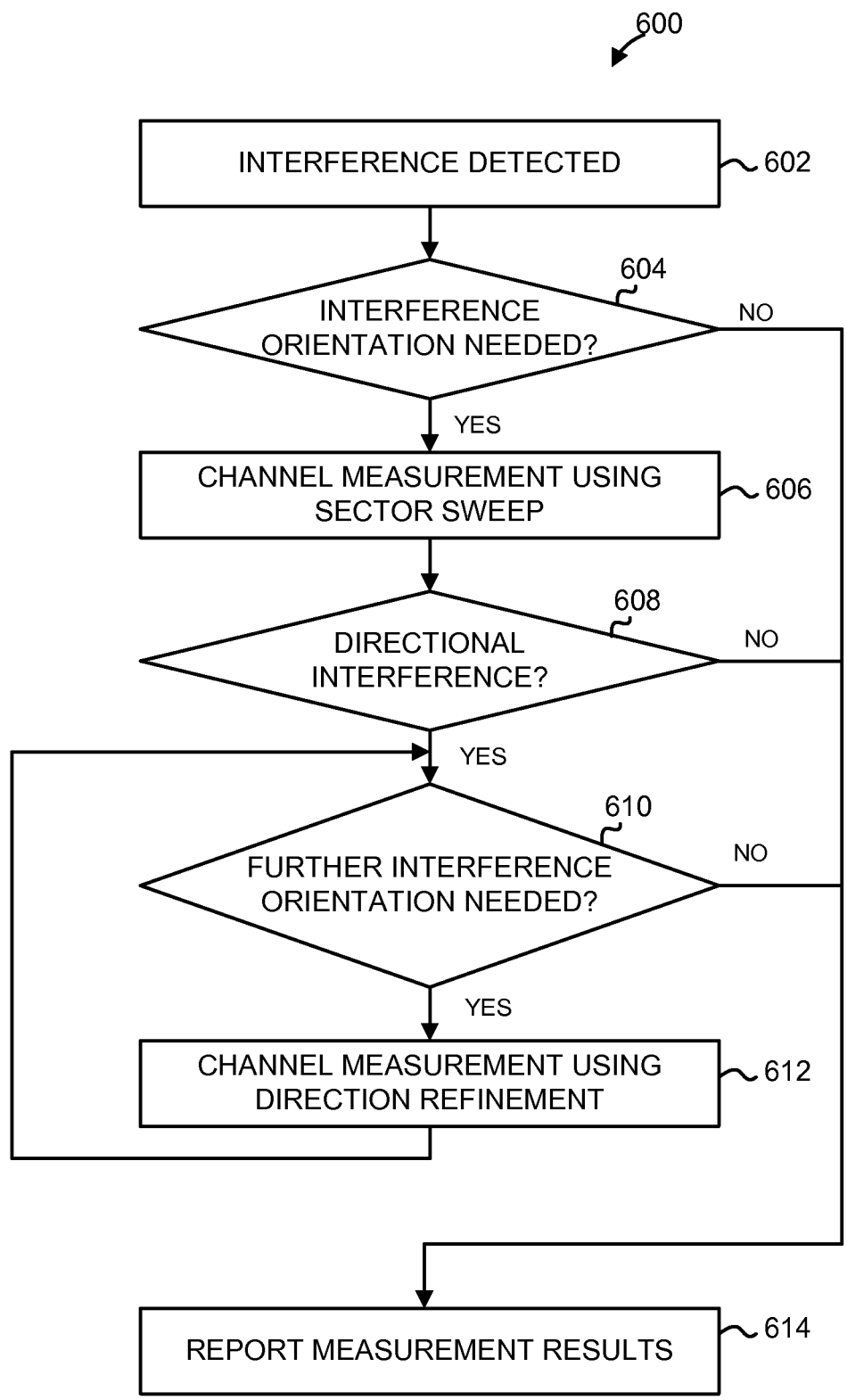
FIG. 12 is a flow diagram of an example method for interference orientation in accordance with an embodiment of the present disclosure.

FIG. 12 is a flow diagram of an example method 600 for interference orientation, at least part of which can be implemented by the directional measurement controller 14, 62, 84, or 404, for example. In an embodiment, the method 600 is implemented in the spectrum management protocol layer controller 500 discussed with reference to FIG. 11.

At block 602, interference is detected. For example, a CCA procedure conducted on a communication channel results in a busy indication, or the receiving power is measured at a high level while signal-to-noise ratio (SNR) is low. If it is determined at block 604 that interference orientation is needed (for example, upon checking the device configuration), several channel measurements along rough (sectored) directions are conducted at block 606. An example of one such procedure is illustrated in, and discussed with reference to, FIG. 1C. On the other hand, if it is determined at block 604 that interference orientation is not needed, the method proceeds to block 614 to report the results.

At block 608, it is determined whether the interference detected at block 602 is directional. To this end, a device can calculate the variance among sectored interference measurements. If, for example, the variance exceeds a certain threshold, the interference signal is considered to be directional. If the interference is not directional, the method 600 proceeds to block 614, and the device can consider the communication channel unusable and attempt to switch to another channel. Otherwise, if the interference is directional, at block 610 it is determined whether additional interference orientation is required. In an example scenario, if it is determined at block 610 that additional interference orientation is required, a sector is divided into several refined directions and channel quality measurements are conducted on the refined directions at block 612. In an embodiment, the variance is again calculated at block 610 and, if the variance of the several directions measured in the block 608 or 612 is below a certain threshold, the method 600 considers that a sufficiently high resolution has been achieved. On the other hand, if it is determined at block 610 that additional interference orientation is not required, the method proceeds to block 614.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method in a communication network including a first communication device and a second communication device, wherein the first communication device includes multiple antennas and is configured to implement receive beamforming using the multiple antennas, the method comprising:
   receiving, at the first communication device, a message from the second communication device, wherein the message indicates a request to make a plurality of directional channel quality measurements using receive beamforming;
   making, at the first communication device, a plurality of directional channel quality measurements regarding a quality of a communication channel between the first communication device and the second communication device, wherein each directional channel quality measurement is made by the first communication device i) in a different one of a plurality of directions from the standpoint of the first communication device by applying a respective different receive beamforming vector and ii) while the first communication device is not receiving a signal that is a) from the second communication device and b) intended for the first communication device;
   determining, at the first communication device, a direction of directional interference using the plurality of directional measurements;
   separate from making the plurality of directional channel quality measurements, performing, at the first communication device, a beamforming training procedure with the second communication device; and
   selecting, at the first communication device, a beamforming vector to use when communicating with the second communication device based on i) the determined direction of the directional interference, and ii) results of the beamforming training procedure.

2. The method of claim 1, further comprising:
calculating, at the first communication device, a variance of the plurality of directional interference measurements; and
comparing, at the first communication device, the calculated variance to a threshold value to determine whether interference is directional.

3. The method of claim 1, further comprising:
determining, at the first communication device, a set of one or more directions associated with the directional interference;
wherein performing the beamforming training procedure comprises restricting the beamforming training procedure such that beamforming training is not performed in the set of one or more directions associated with the directional interference.

4. The method of claim 3, wherein determining the set of one or more directions associated with the directional interference comprises:
measuring, at the first communication device, respective levels of interference on for a plurality of directions to define a plurality of directional interference measurements; and
generating, at the first communication device, an interference mask that indicates, for each of the plurality of directions, whether the respective interference measurement is above a threshold value.

5. The method of claim 1, wherein:
making the plurality of directional channel quality measurements is performed during one or more first scheduled time slots; and
performing the beamforming training procedure is performed during one or more second scheduled time slots.

6. The method of claim 5, wherein:
the one or more first scheduled time slots are scheduled for one or more beamforming training sessions for communication devices other than the first communication device and the second communication device.

7. The method of claim 1, wherein the message is associated with poor channel quality on a beamformed communication link between the first communication device and the second communication device.

8. An apparatus, comprising:
one or more integrated circuit devices associated with a first communication device having multiple antennas and being configured to implement receive beamforming using the multiple antennas, wherein the one or more integrated circuit devices are configured to receive a message from a second communication device, wherein the message indicates a request to make a plurality of directional channel quality measurements, using receive beamforming;
a controller implemented on the one or more integrated circuit devices, wherein the controller is configured to:
make a plurality of directional channel quality measurements regarding a quality of a communication channel between the first communication device and the second communication device, wherein each directional channel quality measurement is made i) in a different one of a plurality of directions from the standpoint of the first communication device by applying a respective different receive beamforming vector and ii) while the first communication device is not receiving a signal that is a) from the second communication device and b) intended for the first communication device, and
determine a direction of directional interference using the plurality of directional measurements;
wherein the one or more integrated circuit devices are further configured to:
separate from making the plurality of directional channel quality measurements, perform a beamforming training procedure with the second communication device, and
select a beamforming vector to use when communicating with the second communication device based on i) the determined direction of the directional interference, and ii) results of the beamforming training procedure.

9. The apparatus of claim 8, wherein the controller is configured to:
calculate a variance of the plurality of directional interference measurements; and
comparing, at the first communication device, the calculated variance to a threshold value to determine whether interference is directional.

10. The apparatus of claim 8, wherein the one or more integrated circuit devices are further configured to:
determine a set of one or more directions associated with the directional interference;
restrict the beamforming training procedure such that beamforming training is not performed in the set of one or more directions associated with the directional interference.

11. The apparatus of claim 10, wherein:
the controller is further configured to:
measure respective levels of interference on for a plurality of directions to define a plurality of directional interference measurements, and
generate an interference mask that indicates, for each of the plurality of directions, whether the respective interference measurement is above a threshold value; and
the one or more integrated circuit devices are further configured to perform the beamforming training procedure using the mask.

12. The apparatus of claim 8, wherein the one or more integrated circuit devices are further configured to:
make the plurality of directional channel quality measurements during one or more first scheduled time slots; and
perform the beamforming training procedure during one or more second scheduled time slots.

13. The apparatus of claim 12, wherein:
the one or more first scheduled time slots are scheduled for one or more beamforming training sessions for communication devices other than the first communication device and the second communication device.

14. The apparatus of claim 8, wherein the message is associated with poor channel quality on a beamformed communication link between the first communication device and the second communication device.

* * * * *